US008694719B2

(12) United States Patent
Lassa et al.

(10) Patent No.: US 8,694,719 B2
(45) Date of Patent: Apr. 8, 2014

(54) CONTROLLER, STORAGE DEVICE, AND METHOD FOR POWER THROTTLING MEMORY OPERATIONS

(75) Inventors: Paul A. Lassa, Cupertino, CA (US); Robert D. Selinger, San Jose, CA (US)

(73) Assignee: SanDisk Technologies Inc., Plano, TX (US)

( * ) Notice: Subject to any disclaimer, the term of this patent is extended or adjusted under 35 U.S.C. 154(b) by 236 days.

(21) Appl. No.: 13/167,929

(22) Filed: Jun. 24, 2011

(65) Prior Publication Data

US 2012/0331207 A1 Dec. 27, 2012

(51) Int. Cl.
G06F 12/00 (2006.01)
(52) U.S. Cl.
USPC .................................. 711/103; 711/E12.008
(58) Field of Classification Search
None
See application file for complete search history.

(56) References Cited

U.S. PATENT DOCUMENTS

| | | | |
|---|---|---|---|
| 5,661,848 A * | 8/1997 | Bonke et al. | 711/112 |
| 6,034,882 A | 3/2000 | Johnson et al. | |
| 6,185,122 B1 | 2/2001 | Johnson et al. | |
| 6,230,233 B1 | 5/2001 | Lofgren | |
| 6,420,215 B1 | 7/2002 | Knall et al. | |
| 6,522,580 B2 | 2/2003 | Chen et al. | |
| 6,594,183 B1 | 7/2003 | Lofgren | |
| 6,631,085 B2 | 10/2003 | Kleveland et al. | |
| 6,735,546 B2 | 5/2004 | Scheuerlein | |
| 6,771,536 B2 | 8/2004 | Li et al. | |
| 6,954,394 B2 | 10/2005 | Knall et al. | |
| 6,986,011 B2 * | 1/2006 | Arimilli et al. | 711/165 |
| 6,988,175 B2 | 1/2006 | Lasser | |
| 7,010,653 B2 * | 3/2006 | Uchida et al. | 711/158 |
| 7,012,835 B2 | 3/2006 | Gonzalez et al. | |
| 7,057,958 B2 | 6/2006 | So et al. | |
| 7,069,394 B2 * | 6/2006 | Arimilli et al. | 711/148 |
| 7,081,377 B2 | 7/2006 | Cleeves | |
| 7,127,573 B1 * | 10/2006 | Strongin et al. | 711/158 |
| 7,171,536 B2 | 1/2007 | Chang et al. | |

(Continued)

FOREIGN PATENT DOCUMENTS

WO WO 2009/088920 7/2009

OTHER PUBLICATIONS

Minsik Cho et al., "PEAKASO: Peak-Temperature Aware Scan-Vector Optimization", VLSI Test Symposium, 2006, Preceedings, $24^{th}$ IEEE, pp. 1-6.*

(Continued)

Primary Examiner — Edward Dudek, Jr.
Assistant Examiner — Christopher Birkhimer
(74) Attorney, Agent, or Firm — Brinks Gilson & Lione

(57) ABSTRACT

The embodiments described herein provide a controller, storage device, and method for power throttling memory operations. In one embodiment, a controller is provided in a storage device with a plurality of flash memory devices. The controller determines how much power will be consumed (or heat will be generated) by each of a plurality of commands and dynamically alters when each of the commands operating on one or more of the flash memory devices is performed based on the determination of how much power would be consumed (or heat will be generated), so that performance of the plurality of commands does not exceed a predetermined average power limit over a period of time (or a predetermined temperature). In some embodiments, the storage device also has a thermal sensor, and a reading from the thermal sensor can be used, instead of or in addition to the power or thermal costs of each command, to dynamically alter when the commands are performed.

37 Claims, 12 Drawing Sheets

(56) References Cited

U.S. PATENT DOCUMENTS

| | | | |
|---|---|---|---|
| 7,215,580 B2 | 5/2007 | Gorobets | |
| 7,224,607 B2 | 5/2007 | Gonzalez et al. | |
| 7,283,414 B1 | 10/2007 | So et al. | |
| 7,334,144 B1* | 2/2008 | Schlumberger | 713/320 |
| 7,366,029 B2 | 4/2008 | Kagan | |
| 7,366,832 B2* | 4/2008 | Lantry et al. | 711/111 |
| 7,379,330 B2 | 5/2008 | Conley et al. | |
| 7,447,066 B2 | 11/2008 | Conley et al. | |
| 7,477,547 B2 | 1/2009 | Lin | |
| 7,631,245 B2 | 12/2009 | Lasser | |
| 7,701,764 B2 | 4/2010 | Nguyen | |
| 7,721,011 B1* | 5/2010 | Sutera | 710/6 |
| 7,724,602 B2* | 5/2010 | Hur et al. | 365/226 |
| 7,739,461 B2* | 6/2010 | Hur et al. | 711/158 |
| 7,752,471 B1 | 7/2010 | Kolokowsky | |
| 7,907,469 B2 | 3/2011 | Sohn et al. | |
| 7,984,360 B2 | 7/2011 | Sharon et al. | |
| 8,059,455 B2 | 11/2011 | Stern et al. | |
| 8,127,200 B2 | 2/2012 | Sharon et al. | |
| 8,154,918 B2 | 4/2012 | Sharon et al. | |
| 2003/0046630 A1* | 3/2003 | Hilbert | 714/763 |
| 2003/0115476 A1 | 6/2003 | McKee | |
| 2003/0225969 A1* | 12/2003 | Uchida et al. | 711/112 |
| 2004/0267409 A1 | 12/2004 | De Lorenzo et al. | |
| 2005/0094665 A1 | 5/2005 | Nalawadi et al. | |
| 2006/0112240 A1* | 5/2006 | Walker et al. | 711/154 |
| 2006/0174151 A1 | 8/2006 | Lin et al. | |
| 2007/0159907 A1 | 7/2007 | Kwak | |
| 2007/0294490 A1* | 12/2007 | Freitas et al. | 711/154 |
| 2007/0294552 A1 | 12/2007 | Kakihara et al. | |
| 2008/0040563 A1 | 2/2008 | Brittain et al. | |
| 2008/0235441 A1* | 9/2008 | Sherman | 711/103 |
| 2009/0019243 A1* | 1/2009 | Hur et al. | 711/158 |
| 2010/0023800 A1 | 1/2010 | Harari et al. | |
| 2010/0070681 A1 | 3/2010 | Wan et al. | |
| 2010/0088557 A1* | 4/2010 | Weingarten et al. | 714/704 |
| 2010/0106889 A1* | 4/2010 | Manning | 711/103 |
| 2010/0125695 A1* | 5/2010 | Wu et al. | 711/103 |
| 2010/0146068 A1* | 6/2010 | Haviv | 709/212 |
| 2010/0146205 A1* | 6/2010 | Baum et al. | 711/113 |
| 2010/0211808 A1 | 8/2010 | Jeong et al. | |
| 2011/0040924 A1 | 2/2011 | Selinger | |
| 2011/0041005 A1 | 2/2011 | Selinger | |
| 2011/0041039 A1 | 2/2011 | Harari et al. | |
| 2011/0122691 A1 | 5/2011 | Sprouse | |
| 2011/0153911 A1 | 6/2011 | Sprouse et al. | |
| 2011/0161554 A1 | 6/2011 | Selinger et al. | |
| 2011/0161784 A1 | 6/2011 | Selinger et al. | |

OTHER PUBLICATIONS

U.S. Appl. No. 12/982,833 entitled, "Controller and Method for Performing Background Operations", inventors: Lassa et al., filed on Dec. 30, 2010, 40 pages.

Office Action for U.S. Appl. No. 13/296,898 dated Nov. 6, 2013, 10 pages.

* cited by examiner

CONTROLLER, STORAGE DEVICE, AND METHOD FOR POWER THROTTLING MEMORY OPERATIONS

BACKGROUND

A solid state drive (SSD) is designed to provide reliable and high performance storage of user data across a flash-based memory system containing a host interface controller (such as a Serial Advanced Technology Attachment (SATA)) interface) and a number of memory multi-chip packages (MCPs), where each MCP contains a flash memory controller and a stack of NAND flash dies. The Open NAND Flash Interface (ONFI) protocol provides support for parallel access to multiple NAND dies (or "logical units" (LUNs)) on a single "target" or NAND multi-chip stack on a single shared ONFI channel. In a typical SATA-based SSD application, a central host controller accesses multiple attached devices (targets/NAND device clusters) on each ONFI channel, and across several ONFI channels. Each ONFI target typically controls 2, 4, or 8 NAND dies. Storage management software running on the host controller manages a virtual memory space that is mapped to flash blocks in the physical dies in each of the attached MCP's. The host controller and the storage management software utilize parallel access and efficient usage of the available flash devices to optimize SSD drive performance, endurance, and cost. The system often must achieve these optimizations within product-related or technology-related power and thermal limits, which are often set forth in the specifications for the product. For example, in some SSD assemblies, the SSD assembly must not exceed 10 W peak power consumption under any operational mode. As another example, in some MCP packages, the MCP package must not exceed 90 degrees Celsius under any operational scenario.

Different techniques have been used to manage power and case temperature within required limits. For example, the host controller or the storage management software can employ techniques such as load balancing, "hot spot" prevention, and regulating garbage collection activity in order to lower the overall temperature of the device. As another example, the host can employ a host-initiated power management/power-down (HIPM/HIPD) technique in which the host de-powers some number of target modules or directs them to enter a standby/power-down mode. In this way, the host reduces traffic to some number of devices. As yet another example, the storage device can employ a device-initiated power management/power-down (DIPM/DIPD) technique in which the controller within the memory module monitors host activity and incoming commands and, if a first threshold amount of time passes with no activity, the controller can reduce its clocks and/or power-down some of its sub-modules, such that its response to new commands will be longer or slower. If a second longer threshold amount of time passes with no activity, the controller can possibly enter a low-power standby or sleep mode, in which a small amount of wake-up circuitry remains powered, but responses to new commands will be further increased or slowed.

SUMMARY

The present invention is defined by the claims, and nothing in this section should be taken as a limitation on those claims.

By way of introduction, the embodiments described below provide a controller, storage device, and method for power throttling memory operations. In one embodiment, a controller is provided in a storage device with a plurality of flash memory devices. The controller determines how much power will be consumed (or heat will be generated) by each of a plurality of commands and dynamically alters when each of the commands operating on one or more of the flash memory devices is performed based on the determination of how much power would be consumed (or heat will be generated), so that performance of the plurality of commands does not exceed a predetermined average power limit over a period of time (or a predetermined temperature). In some embodiments, the storage device also has a thermal sensor, and a reading from the thermal sensor can be used, instead of or in addition to the power or thermal costs of each command, to dynamically alter when the commands are performed.

Other embodiments are disclosed, and each of the embodiments can be used alone or together in combination. The embodiments will now be described with reference to the attached drawings.

DETAILED DESCRIPTION OF THE PRESENTLY PREFERRED EMBODIMENTS

Introduction

Figure 1:
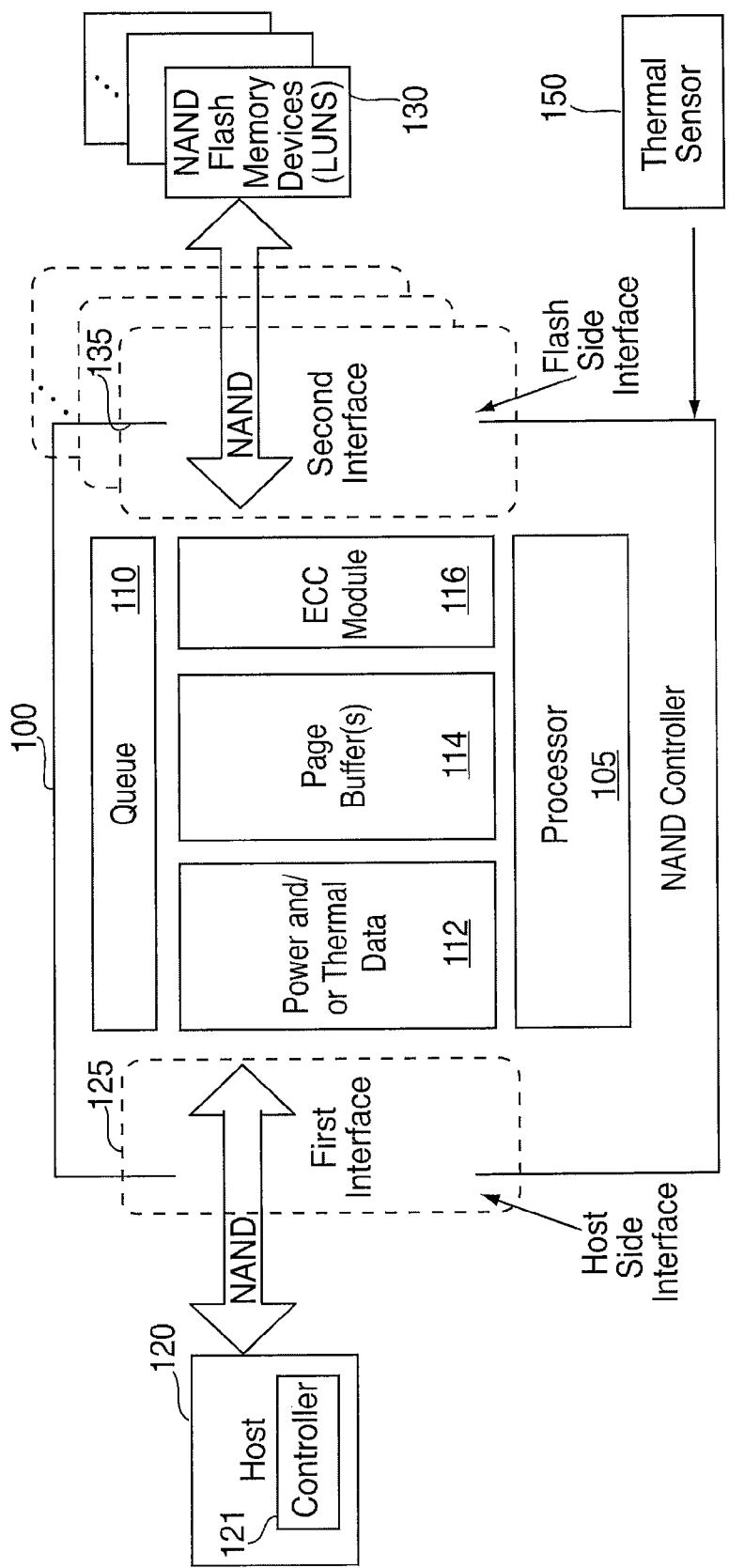
FIG. 1 is a block diagram of an exemplary controller of an embodiment.

As discussed above, to meet power or thermal limits of a storage device, "macro-level" solutions can be employed to slow the clock of the storage device's controller or run at a slower bus speed in order to reduce the number of heat-producing commands that are performed over a given period of time. While these macro-level solutions can be effective at managing power consumption by modulating or reducing the overall workload or traffic rate, these sorts of "all-or-nothing" techniques may not provide optimum performance.

The following embodiments are directed to techniques that can meet power or thermal limits of a storage device while providing better performance. In general, the controller of these embodiments looks at a plurality of commands to be performed by a plurality of flash memory devices in a storage device and determines how much power will be consumed (or how much heat will be generated) by each of the commands. By determining the "power or thermal cost" of the commands on a command-by-command basis, the controller is able to dynamically (e.g., on the fly) alter when each of the commands is performed so that performance of the commands in the aggregate does not exceed a predetermined average power limit over a period of time (an "operations window") or a predetermined temperature, as set forth in the specifications of the storage device. Accordingly, instead of using "all-or-nothing" macro-level techniques, the flash memory controller in these embodiments uses low-level techniques to determine the power cost of each command and to control, on a command-to-command basis, how these commands can be optimally performed while staying within the power or thermal budget. Also, in some embodiments, the controller and/or flash memory device(s) has a thermal sensor, and a reading from the thermal sensor can be used, instead of or in addition to the power or thermal costs of each command, to dynamically alter when the commands are performed.

Because it is the storage device's controller—and not a host processor—that facilitates power and thermal regulations, these embodiments can be used with multi-chip packages (MCP) (i.e., a controller and N number of LUNs) that serve multiple host processing instances that are unaware of each other. For example, a host may be running four independent instances of a flash memory management application, where one or two LUNs on a four or eight LUN MCP are allocated or dedicated to each of the instances. In this case, each independent instance of the flash memory management knows how much and what kind of traffic it is sending, but it does not know what the other three instances are sending. Centralizing power regulation control in the controller of the MCP overcomes this problem. Additionally, host-side power management code cannot predict the low-level timings (e.g., arrivals, latencies, errors, etc.) and interactions among the different Flash devices (LUNs) after multiple streams have been sent over an ONFI channel to a shared MCP. These embodiments recognize that it is the MCP itself (controller and firmware) that is in the "best observer" position to react and implement on-the fly power regulation of the shared controller and stack of flash dies nearing the upper power or thermal limit.

Before turning to details of the power throttling embodiments, the following section discusses exemplary controller architectures that can be used with these embodiments.

Exemplary Controller Architectures

Turning now to the drawings, FIG. 1 is a block diagram of an exemplary controller 100 of an embodiment. As shown in FIG. 1, the controller 100 is in communication with a host 120 (having a host controller 121) through a first interface 125 and is in communication with one or more NAND flash memory device(s) (or "logical units" (LUNs)) 130 through one or more second interface(s) 135. (The host controller in solid state drive (SSD) applications can have one or more first NAND interfaces (e.g., eight channels), in which case the controller 100 can see only one of those channels.) As used herein, the phrase "in communication with" means directly in communication with or indirectly in communication with through one or more components, which may or may not be shown or described herein. Also, while the controller 100 and flash memory device(s) 130 are shown as two separate boxes, it should be understood that the controller 100 and flash memory device(s) 130 can be arranged in any suitable manner (e.g., packaged in different packages, packaged within a common multi-chip package, and or integrated on a same die). In any of these arrangements, the controller can be physically located separately from the host. This allows the controller and flash memory device(s) to be considered a separate circuitry unit, which can be used in a wide variety of hosts.

A "host" is any entity that is capable of accessing the one or more flash memory device(s) 130 through the controller 100, either directly or indirectly through one or more components named or unnamed herein. A host can take any suitable form, such as, but not limited to, a personal computer, a mobile phone, a game device, a personal digital assistant (PDA), an email/text messaging device, a digital camera, a digital media (e.g., MP3) player, a GPS navigation device, a personal navigation system (PND), a mobile Internet device (MID), and a TV system. Depending on the application, the host 120 can take the form of a hardware device, a software application, or a combination of hardware and software.

"Flash memory device(s)" refer to device(s) containing a plurality of flash memory cells and any necessary control circuitry for storing data within the flash memory cells. In one embodiment, the flash memory cells are NAND memory cells, although other memory technologies, such as passive element arrays, including one-time programmable memory elements and/or rewritable memory elements, can be used. (It should be noted that, in these embodiments, a non-NAND-type flash memory device can still use a NAND interface and/or NAND commands and protocols.) One example of a passive element array is a three-dimensional memory array. As used herein, a three-dimensional memory array refers to a memory array comprising a plurality of layers of memory cells stacked vertically above one another above a single silicon substrate. In this way, a three-dimensional memory array is a monolithic integrated circuit structure, rather than a plurality of integrated circuit devices packaged or die-bonded in close proximity to one another. Although a three-dimensional memory array is preferred, the memory array can instead take the form of a two-dimensional (planar) array. The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 6,034,882; 6,185,122; 6,420,215; 6,631,085; and 7,081,377. Also, the flash memory device(s) 130 can be a single memory die or multiple memory dies. Accordingly, the phrase "a flash memory device" used in the claims can refer to only one flash memory device or more than one flash memory device.

As shown in FIG. 1, the controller 100 also comprises a processor 105, a queue (memory) 110, memory storing power and/or thermal data 112, one or more page buffers 114, and an error correction code (ECC) module 116. (The controller 100 can contain other components, which are not shown in FIG. 1 to simplify the drawing.) As used herein, a "module" can include hardware, software, firmware, or any combination thereof. Examples of forms that a "module" can take include, but are not limited to, one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. While only one module (the ECC module 116) is shown in FIG. 1, it should be understood that one or more additional modules for providing other functionality can be used. Examples of these additional modules include, but are not limited to, data scrambling, column replacement, handling write aborts and/or program failures (via safe zones), read scrubbing, wear leveling, bad block and/or spare block management, error detection code (EDC) functionality, status functionality, encryption functionality, error recovery, and address mapping (e.g., mapping of logical to physical blocks). Further information about these various functions is described in U.S. patent application Ser. Nos. 12/539,394; 12/539,407; 12/539,379; 12/650,263; 12/650,255; and 12/539,417, which are hereby incorporated by reference.

As noted above, the controller 100 communicates with the host 120 using a first interface 125 and communicates with the flash memory device(s) 130 using second interface(s) 135. The first and second interfaces can be NAND interfaces operating under NAND interface protocols. Examples of NAND interfaces include, but are not limited to, Open NAND Flash Interface (ONFI), toggle mode (TM), and a high-performance flash memory interface, such as the one described in U.S. Pat. No. 7,366,029, which is hereby incorporated by reference. The controller 100 may optionally include one or more additional host-side interfaces, for interfacing the controller 100 to hosts using non-NAND interfaces, such as SD, USB, SATA, or MMC interfaces. Also, the interfaces 125, 135 can use the same or different NAND interface protocols.

In general, a NAND interface protocol is used to coordinate commands and data transfers between a NAND flash device and a host using, for example, data lines and control signals, such as ALE (Address Latch Enable), CLE (Command Latch Enable), and WE# (Write Enable). Even though the term "NAND interface protocol" has not, to date, been formally standardized by a standardization body, the manufacturers of NAND flash devices all follow very similar protocols for supporting the basic subset of NAND flash functionality. This is done so that customers using NAND devices within their electronic products could use NAND devices from any manufacturer without having to tailor their hardware or software for operating with the devices of a specific vendor. It is noted that even NAND vendors that provide extra functionality beyond this basic subset of functionality ensure that the basic functionality is provided in order to provide compatibility with the protocol used by the other vendors, at least to some extent.

A given device (e.g., a controller, a flash memory device, a host, etc.) is said to comprise, include, or have a "NAND interface" if the given device includes elements (e.g., hardware, software, firmware, or any combination thereof) necessary for supporting the NAND interface protocol (e.g., for interacting with another device using a NAND interface protocol). (As used herein, the term "interface(s)" can refer to a single interface or multiple interfaces. Accordingly, the term "interface" in the claims can refer to only one interface or more than one interface.) In this application, the term "NAND Interface protocol" (or "NAND interface" in short) refers to an interface protocol between an initiating device and a responding device that, in general, follows the protocol between a host and a NAND flash device for the basic read, write, and erase operations, even if it is not fully compatible with all timing parameters, not fully compatible with respect to other commands supported by NAND devices, or contains additional commands not supported by NAND devices. One suitable example of a NAND interface protocol is an interface protocol that uses sequences of transferred bytes equivalent in functionality to the sequences of bytes used when interfacing with a Toshiba TC58NVG1S3B NAND device (or a Toshiba TC58NVG2D4B NAND device) for reading (opcode 00H), writing (opcode 80H), and erasing (opcode 60H), and also uses control signals equivalent in functionality to the CLE, ALE, CE, WE, and RE signals of the above NAND device.

It is noted that a NAND interface protocol is not symmetric in that the host—not the flash device—initiates the interaction over a NAND interface. Further, an interface (e.g., a NAND interface or an interface associated with another protocol) of a given device (e.g., a controller) may be a "host-side interface" (e.g., the given device is adapted to interact with a host using the host-side interface), or the interface of the given device may be a "flash memory device-side interface" (e.g., the given device is adapted to interact with a flash memory device using the flash memory device-side interface). The terms "flash memory device-side interface," "flash device-side interface," and "flash-side interface" are used interchangeably herein.

These terms (i.e., "host-side interface" and "flash device-side interface") should not be confused with the terms "host-type interface" and "flash-type interface," which are terminology used herein to differentiate between the two sides of a NAND interface protocol, as this protocol is not symmetric. Furthermore, because it is the host that initiates the interaction, we note that a given device is said to have a "host-type interface" if the device includes the necessary hardware and/or software for implementing the host side of the NAND interface protocol (i.e., for presenting a NAND host and initiating the NAND protocol interaction). Similarly, because the flash device does not initiate the interaction, we note that a given device is said to have a "flash-type interface" if the device includes the necessary hardware and/or software for implementing the flash side of the NAND protocol (i.e., for presenting a NAND flash device).

Typically, "host-type interfaces" (i.e., those which play the role of the host) are "flash device-side interfaces" (i.e., they interact with flash devices or with hardware emulating a flash device) while "flash device-type interfaces" (i.e., those which play the role of the flash device) are typically "host-side interfaces" (i.e., they interact with hosts or with hardware emulating a host).

Additional information about exemplary controllers (and their advantages over prior controllers) can be found in U.S. Pat. No. 7,631,245 and U.S. patent application Ser. Nos. 12/539,394; 12/539,407; 12/539,379; 12/650,263; 12/650,255; and 12/539,417, which are hereby incorporated by reference.

Figure 2:
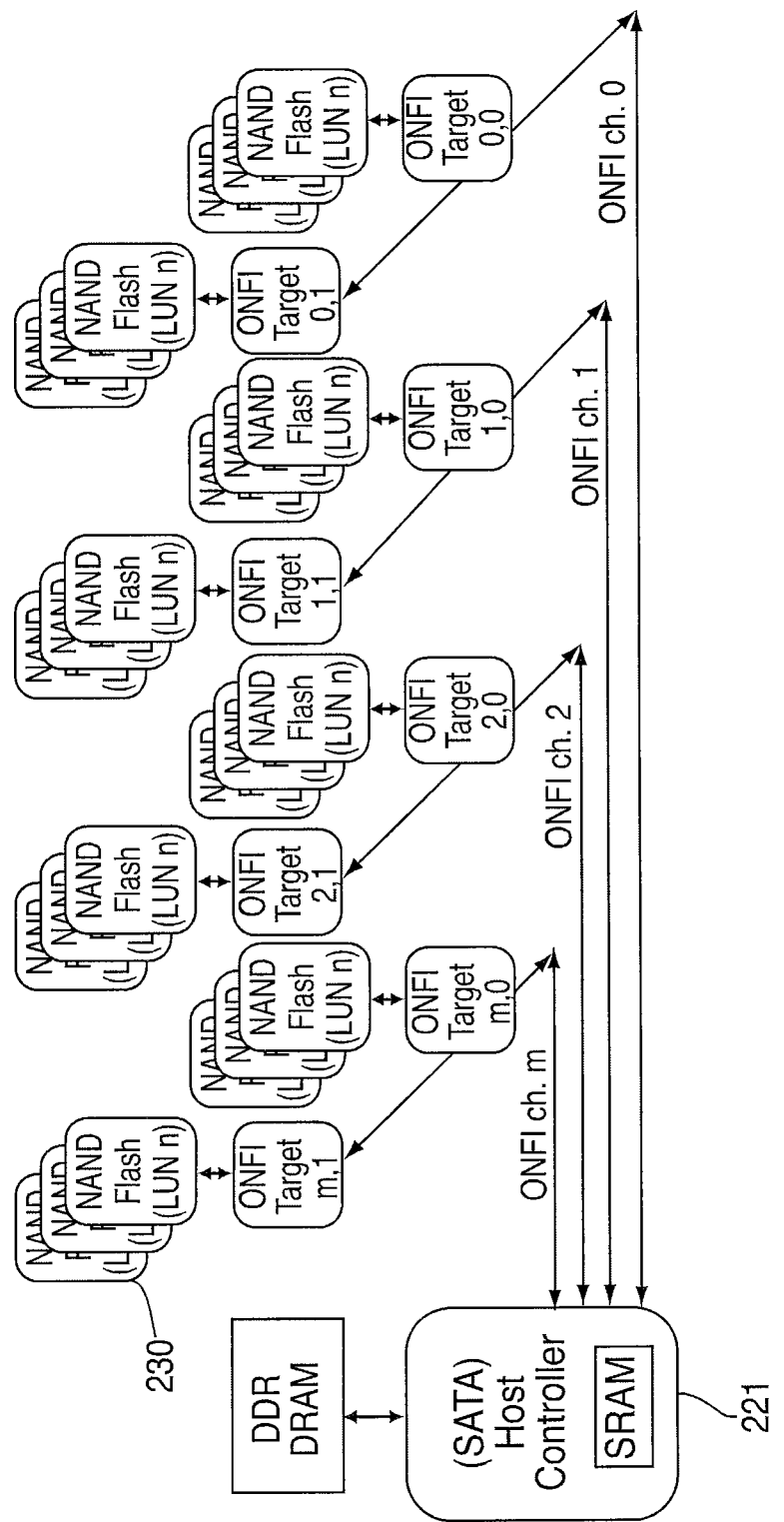
FIG. 2 is a block diagram of a solid state drive of an embodiment.

It should be noted that the controller 100 and flash memory device(s) 130 can be used in any desired system environment. For example, in one implementation, a product manufactured with one or more controller 100/flash memory device(s) 130 units is used in a solid-state drive (SSD). An example of a SATA-based SSD application is shown in FIG. 2, where a central host controller 221 accesses (on each ONFI channel and across several ONFI channels) multiple attached ONFI targets, where each ONFI target contains a controller similar to the controller 100 in FIG. 1 and is connected to a plurality of NAND flash devices 230. As another example, the controller 100 can be used in OEM designs that use a Southbridge controller to interface to flash memory devices.

Figure 3:
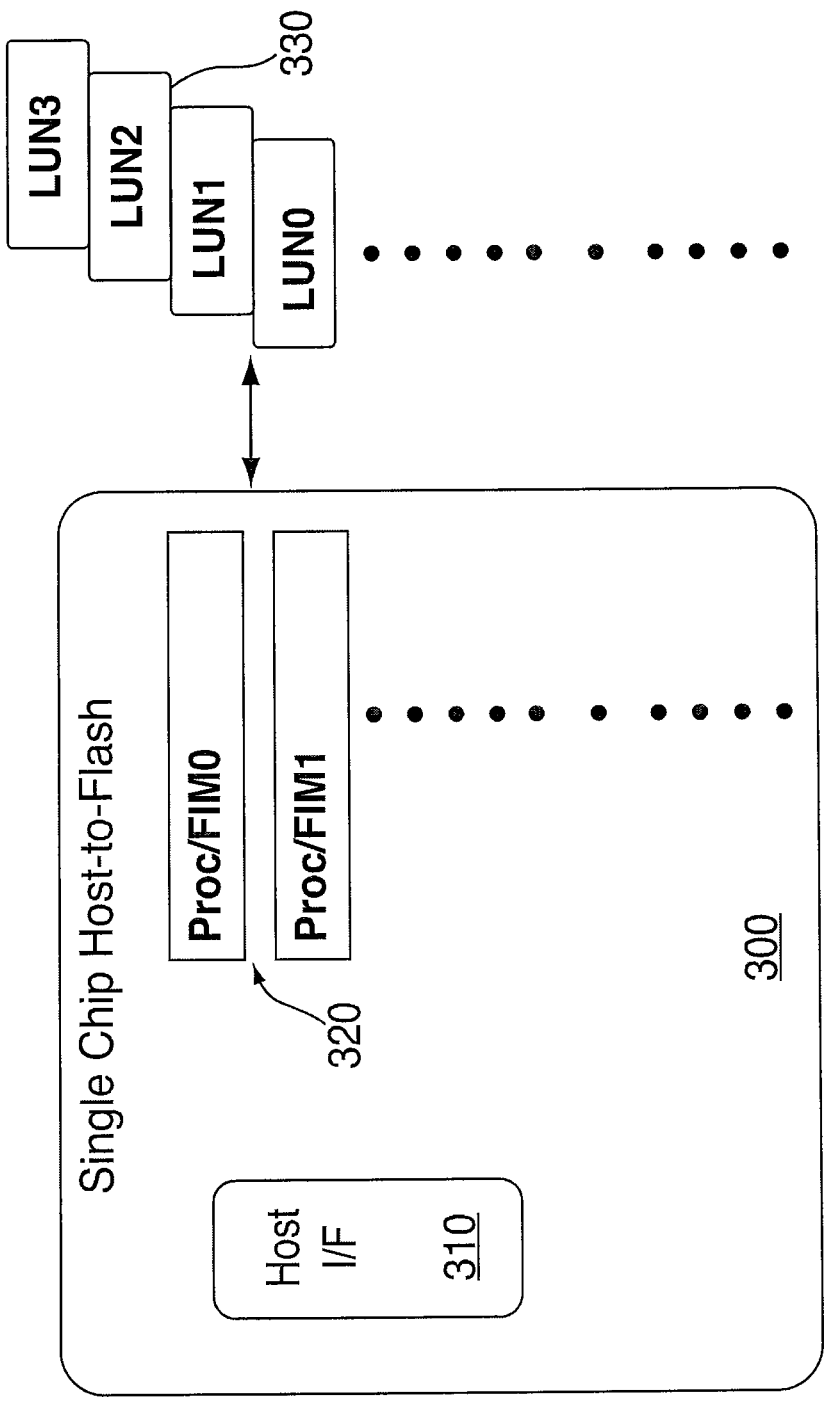
FIG. 3 is a block diagram of an architecture of an embodiment.
Figure 4:
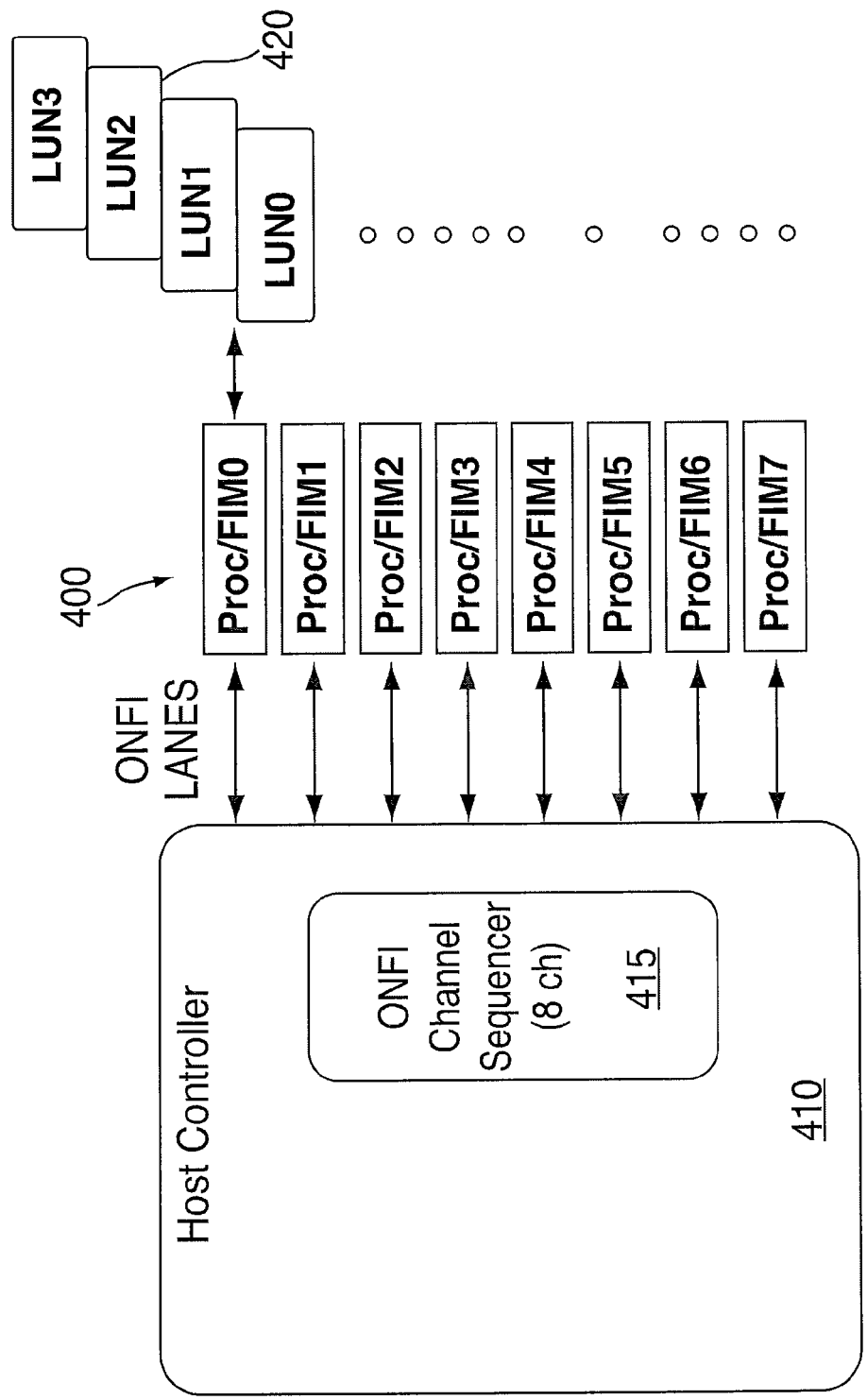
FIG. 4 is a block diagram of an architecture of an embodiment.
Figure 5:
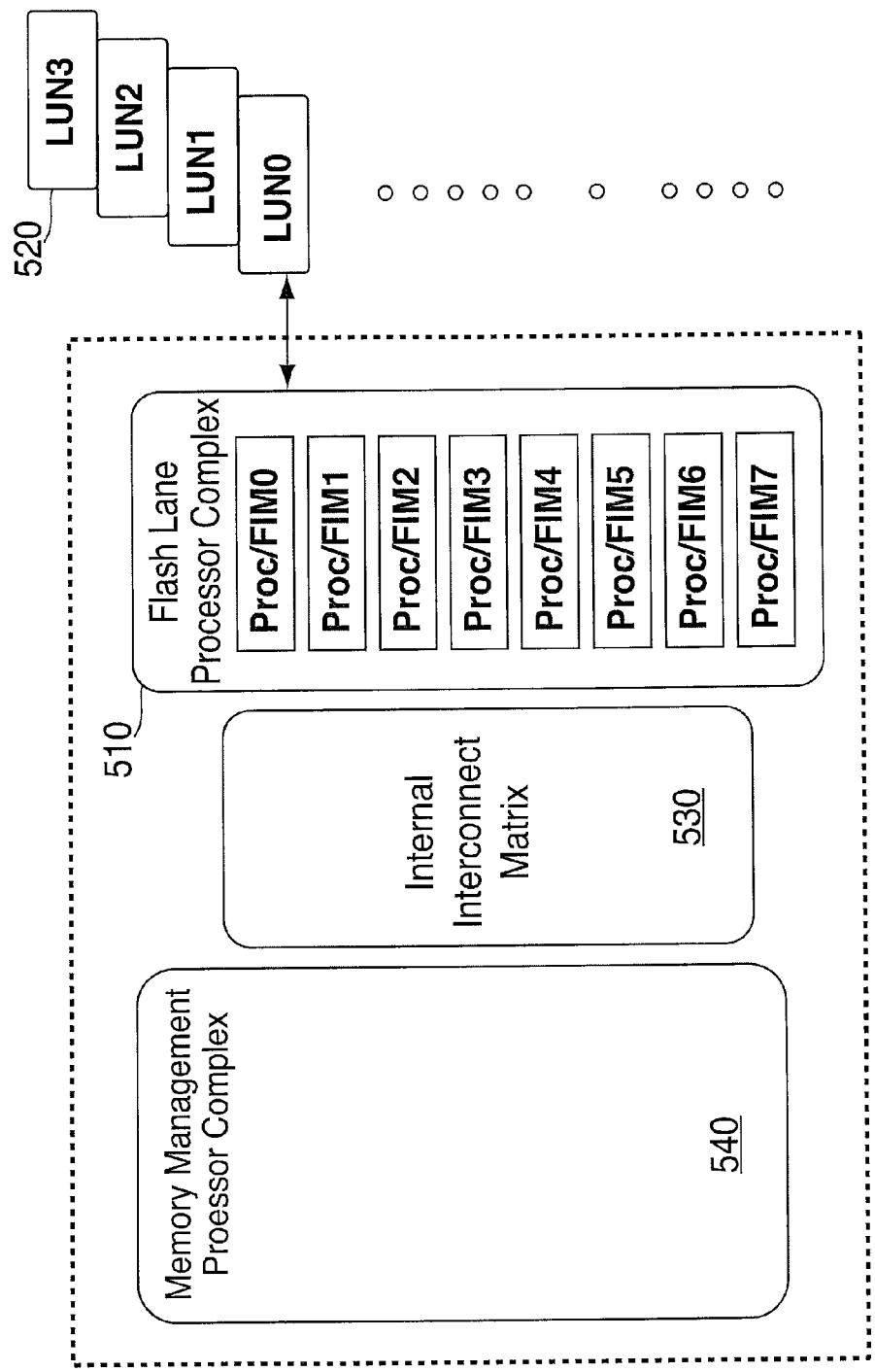
FIG. 5 is a block diagram of an architecture of an embodiment.

It should also be noted that other controller architectures can be used. For example, FIG. 3 illustrates a single chip host-to-flash controller 300. This controller 300 contains a host interface 310 and a plurality of processor/flash interface modules (FIMs) 320. Each of the processor/FIMs is connected to a respective plurality of flash memory devices (LUNs). In another embodiment (shown in FIG. 4), instead of the plurality of processor/FIMs being inside a single controller, each processor/FIM 400 communicates individually with an ONFI channel sequencer 415 in the host controller via respective ONFI lanes. As in FIG. 3, each processor/FIM 400 in this embodiment is connected to a plurality of flash memory devices (LUNs) 420. In yet another embodiment (shown in FIG. 5), the controller contains a flash lane processor complex 510 that contains a plurality of processor/FIMs connected to a plurality of flash memory devices (LUNs) 520. The flash lane processor complex 525 is connected via an internal interconnect matrix 530 to a memory management processor complex 540, that manages the operation of the memory. Of course, these are just examples of some of the architectures that can be used; others can be used. The claims should not be limited to a particular type of architecture unless explicitly recited therein.

The three example architectures above illustrate the variations on how a host platform (PC, laptop, etc.), host interface controller (such as SATA, PCIe, etc.), or simply one or more host processes or execution threads within an integrated storage complex or SOC may produce a plurality of memory storage, memory management, or device maintenance or health operations destined for one or more exemplary Flash Memory controller Lanes, processes, or execution threads, and that at each Flash Memory Lane, power and/or thermal throttling or shaping may be conducted based upon monitoring that Lane's local traffic and/or local temperature.

Now that exemplary controller architectures have been described, the following section provides more information about the power throttling embodiments.

Embodiments Relating to Power Throttling Memory Operations

In these embodiments, a controller can dynamically alter when each individual command of a plurality of commands is performed so that performance of the commands, in the aggregate, does not exceed a predetermined average power limit over a period of time. With reference to FIG. 1, the controller 100 contains a queue 110 that stores a plurality of commands to be performed by the plurality of flash memory devices 130. The commands can be, for example, erase, program, and/or read commands. Some or all of these commands can be received from the host 120 and/or generated by the controller 100. If the commands held in the queue 110 were performed in due course in the order in which they were received from the host 120 or generated internally by the controller 100, it is possible that the performance of those commands could exceed a predetermined average power limit over a period of time, as set forth in the product specifications of the storage device.

One approach to avoid this problem is to slow the controller's clock and/or run the storage device in a slower bus transfer mode. For example, based on a temperature reading of the storage device's thermal sensor 150 and the thermal data stored in the controller 100, the controller 100 can operate in one of the following operating modes:

| Mode | Host Clock Rate | System Clock Rate (Minimum) | FIM Clock |
|---|---|---|---|
| 0 | 20.00 MHz | 55 MHz | 50 MHz |
| 1 | 33.33 MHz | 55 MHz | 50 MHz |
| 2 | 50.00 MHz | 55 MHz | 50 MHz |
| 3 | 66.67 MHz | 60 MHz | 50 MHz |
| 4 | 83.33 MHz | 70 MHz | 83 MHz |
| 5 | 100 MHz | 90 MHz | 83 MHz |

The controller 100 can compare the temperature readings from the thermal sensor 150 against threshold ranges stored in the power and/or thermal data storage 112 in the controller 100. If the temperature is in a normal or cold range, the controller 100 can operate in mode 5, which uses the highest system and FIM clock rates. However, as the temperature increases above the threshold limits set forth in the power and/or thermal data storage 112, the controller 100 can operate in the mode associated with the detected temperature to reduce power/thermal stress by reducing the system and FIM clock and bus transfer speeds.

While modulating or reducing the overall workload or traffic rate can be effective at managing power consumption, this approach may not provide optimum performance, especially where only a few commands are "power hogs." In order to optimize performance while still maintaining power and thermal limits, the controller 100 in these embodiments can store power and/or thermal data 112 for individual commands. That way, the controller 100 can determine how much power will be consumed by each of the plurality of commands stored in the queue, and, if needed, dynamically alter when each of the commands is performed to ensure that performance of the commands does not exceed a predetermined average power limit over a period of time. (The predetermined power limit can be stored in memory location 112 along with the other power and/or thermal data.) By looking at power consumption on a command-by-command basis, the controller 100 can make "micro-level" adjustments to alter when each command is performed rather than "macro-level" adjustments to alter the clock speed to affect when all of the commands are performed. This optimizes performance while still ensuring that the predetermined average power limit over a given period of time is not exceeded.

Any suitable technique(s) can be used by the controller 100 to provide low-level power control and throttling. For example, the controller 110 can managing flash command issuance per their respective power costs and current consumption profiles and durations, per the aggregate traffic level on each multi-chip package (controller+N flash dies/LUNs), or with regard to other functions or operations in the controller. The following paragraphs provide examples of ways the controller 100 can provide such power throttling functions. It should be noted that these are merely examples, and other power throttling techniques can be used. Also, these techniques can be used alone or in combination with each other.

Example 1

Staggering Issuance of Commands

Figure 6:
FIG. 6 is an illustration showing current profiles of multiple program commands.

Referring back to FIG. 1 and as mentioned above, the controller 100 stores power and/or thermal data 112, which can be used in determining when and how to perform a power throttling operation. In one embodiment, the controller 100 stores current profiles for various commands. When commands are to be simultaneously performed, the controller 100 can analyze the result of these current profiles being "stacked together" to see if there is a power concern. For example, with reference to FIG. 6, if the queue 110 stores a plurality of program commands to be performed by eight flash memory devices (LUNs), the controller 100 can analyze what the effect would be if all eight program commands were simultaneously performed. As shown in FIG. 6, the current profile of a program command is not a flat bar and rises to a peak before gradually decreasing. If the program commands were simultaneously performed, their peak currents would all occur at one time, and this can cause the average power over a period of time to exceed the predetermined limit.

Figure 7:
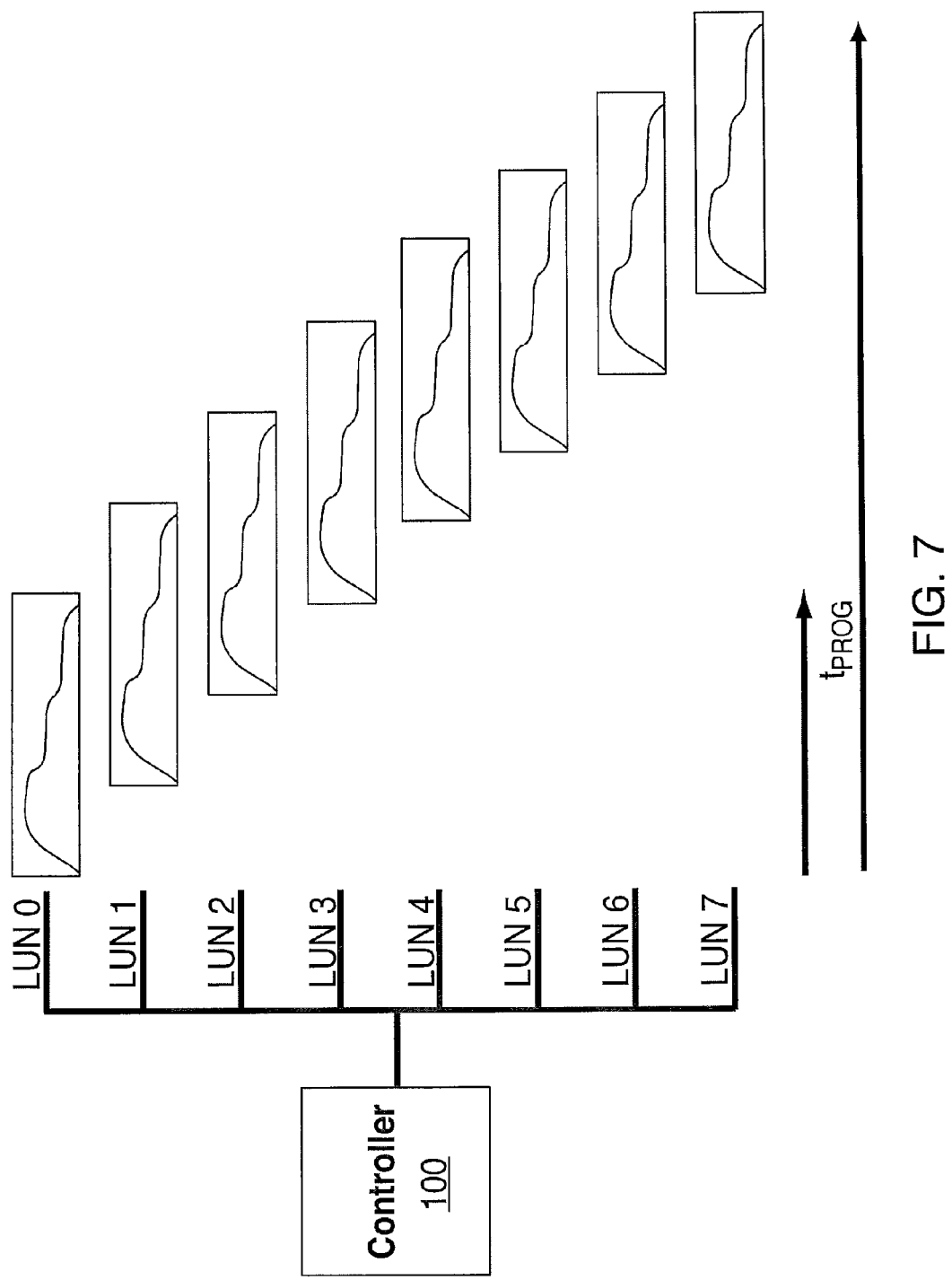
FIG. 7 is an illustration showing the staggering of current profiles of multiple program commands according to an embodiment.

In order to prevent this problem from occurring, the controller 100 of this embodiment can dynamically alter when each of the plurality of commands is performed by staggering issuance of the commands. So, for example, in order to prevent the "stacking" problem shown in FIG. 6, the controller 100 can stagger the issuance of the eight program commands so that their peak current consumption occurs at different times (see FIG. 7). This would limit the simultaneous peak current consumption of the groups of commands when they are performed in the aggregate.

Example 2

Altering When Commands Are Performed

In the previous example, the controller 100 staggered the issuance of commands based on the power implications of each command. In this example, the controller 100 alters when commands are performed by re-ordering (or "staging") the issuance of the commands to the served flash memory devices (LUNs). Consider the situation where a number of program, read, and erase commands are to be performed across eight flash memory devices (LUNs). In this embodiment, the controller 100 stores power information associated with each of the commands. For example, if the flash memory devices are 32 nm×2 devices, the controller 100 can store the following power information:

| Command | Duration | Average Power |
|---|---|---|
| $T_{Erase}$ | 1,400 usec | — |
| $T_{Prog}$ | 400 usec | — |
| $T_{Prog\_L}$ | 400 usec | — |
| $T_{Prog\_H}$ | 2,000 usec | — |
| $T_{Prog\_Avg\_L\_H}$ | ~1,600 usec | 6.6 W (for 300 MB/s, 32 nm X2) |
| $T_{Read\_Fast}$ | 30 usec | 1.7 W (for 400 MB/s, 32 nm X2) |
| $T_{Read\_Slow}$ | 150 usec | 2.2 W (for 400 MB/s, 32 nm X2) |
| $T_{Read\_L\_Fast}$ | 30 usec | — |
| $T_{Read\_L\_Slow}$ | 130 usec | — |
| $T_{Read\_U\_Fast}$ | 50 usec | — |
| $T_{Read\_U\_Slow}$ | 150 usec | — |

Figure 8:
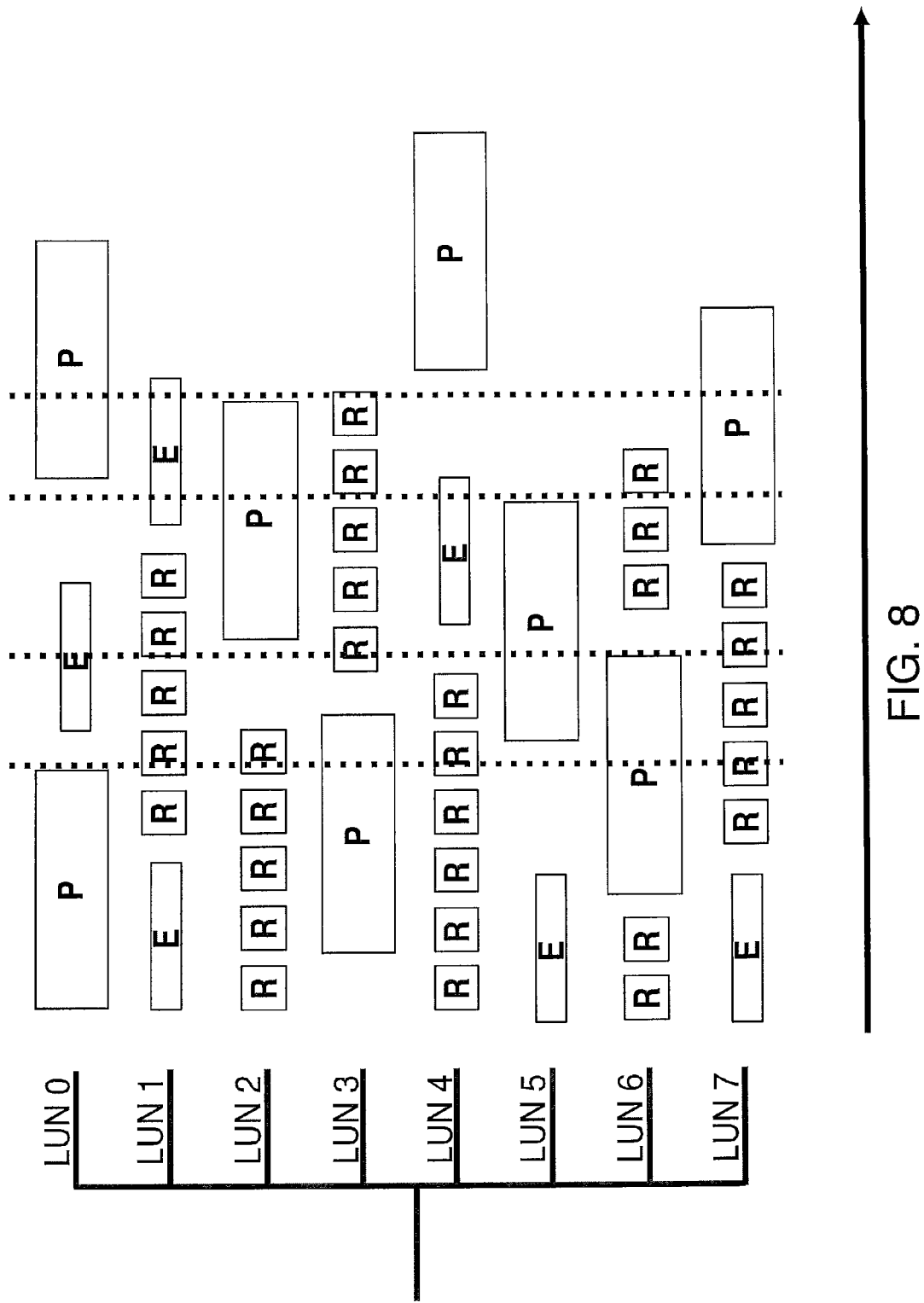
FIG. 8 is an illustration showing reordering of commands according to an embodiment.

For each of the commands stored in the queue 100, the controller 100 can look-up the associated power cost for each command and determine the implication on average power if all of the commands are performed in due course. If the controller 100 determines that the performance of the commands would exceed the predetermined average power over a period of time, the controller 100 can alter when the commands are performed. For example, with reference to FIG. 8, based on the power costs stored in the controller 100, the controller 100 may decide that only a maximum of three program commands over 8 LUNs should be performed at a given time to minimize peak power. Accordingly, with reference to the left-most dashed vertical line in FIG. 8, to ensure that the program operations on LUN 5 does not occur at the same time as the program operations on LUNs 0, 3, and 6, the controller 100 delays the start of the program operation on LUN 5 until after the program operation on LUN 0 is complete. Similarly, with respect to the right-most dashed line in FIG. 8, the controller 110 can delay the performance of the program operation on LUN 4 so that it does not overlap the program operations on LUNs 0, 2, and 7.

It should be noted that the altering of the commands occurs on a command-by-command basis and does not necessarily affect the timing of all of the commands. For example, with reference to FIG. 8, while the performance of the program operation on LUN 4 is delayed so that it does not overlap the program operations on LUNs 0, 2, and 7, the read and erase commands to LUN 4 may be performed as intended. That is, unlike prior "macro-level" solutions that slow down the controller's clock speed to slow down performance of all commands, the controller 100 in this embodiment operates on a finer degree of granularity, which results in better performance while still maintaining thermal and power limits.

Example 3

Staggering Issuance of Read Commands Based on ECC Rate

In some situations, the power cost of an operation may vary from an expected value based on other factors. For example, a read operation can result in different power levels being used based on the activity level of the controller's ECC module 116. The ECC module 116 contains both error detection logic and error correction logic. When data is read from the plurality of flash memory devices 130, the ECC detection logic checks for errors, which consumes a certain amount of time and current. However, if errors are found, the error correction logic consumes additional time and current to correct the errors. As shown by the following table for performing ECC correction on a block of information (here, 2K bytes of data and 26 bytes of header) at 200 MHz, the more bits that need correcting, the more time is needed by the error correction logic to correct the errors:

| Error Bits | 42 Bit Errors ECC Clocks | Access Time | 52 Bit Errors ECC Clocks | Access Time |
|---|---|---|---|---|
| 10 | 1,282 | 6.41 usec | 1,337 | 6.69 usec |
| 20 | 1,404 | 7.02 usec | 1,453 | 7.27 usec |
| 30 | 1,527 | 7.64 usec | 1,586 | 7.93 usec |
| 42 | 1,649 | 8.25 usec | 1,759 | 8.80 usec |
| 52 | N/A | N/A | 1,860 | 9.30 usec |

Figure 9:
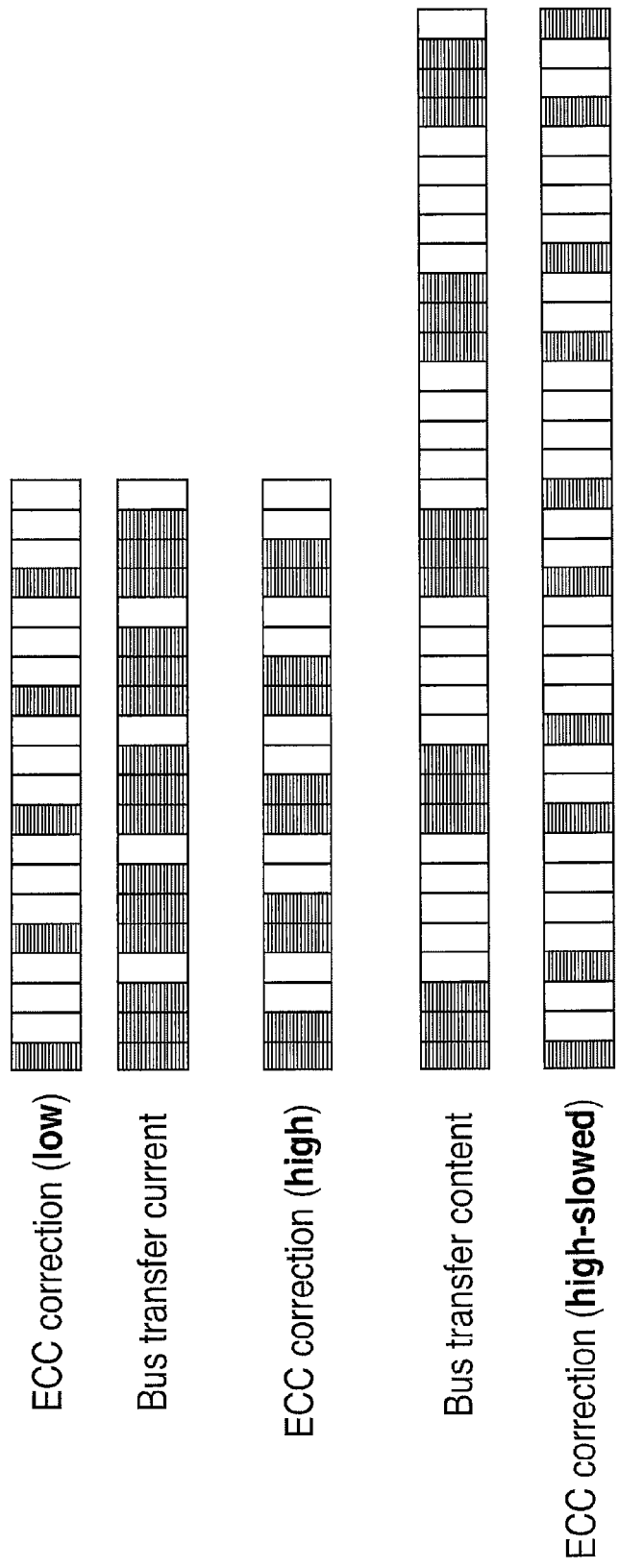
FIG. 9 is an illustration showing staggering of read commands to slow bus transfer current according to an embodiment.

The more access time that is used by the ECC module 116, the higher the current consumption. This is a source of power that should be considered, in addition to the power cost of the underlying read command, when the controller 100 considers the overall power implications of a read command. This is illustrated in FIG. 9. Read commands generally pipeline or overlap the activity of the ECC module 116. With reference to the top two lines in FIG. 9, when no or just a few bit errors are detected and corrected, the activity of the ECC module 116 overlaps the performance of read commands (expressed here by bus transfer current) in one of three time cycles. However, as illustrated in the third line in FIG. 9, as the number of bit errors increases, there is more overlap of ECC module activity and bus transfer current. Because of this overlap, the power cost of a read operation is not just the power cost associated with the read command, but also the power cost of the use of the ECC module 116.

In order to address this issue, the controller 100 can dynamically stagger the issuance of read commands based on an error correction code rate of the ECC module 116. This is illustrated in the last two lines of FIG. 9. The ECC module 116 would still use two cycles of time to correct the bit errors, but because the read commands are spread out, the ECC module 116 can partially operate in periods of time where there is no overlap with a read command bus transfer current. The overall effect of this is slowing down the ECC module 116 operation or staggering it to reduce overlap with bus transfer current, thereby avoiding the power build up discussed above. Bus transfer current is still consumed and the higher level of ECC current is accommodated by maintaining a lesser degree of overlap of these two contribution currents.

Example 4

Modulating Performance of Background Commands

The controller 100 in FIG. 1 can be configured to perform a background command whenever possible when no host foreground commands are currently being executed. As used herein, a "foreground command" refers to a command for an operation that is preferably performed to completion without being interrupted and typically has a predetermined completion time. A foreground command is typically issued by the host controller 121 and sent to the NAND controller 100 for execution. In contrast, a "background command" refers to a command for an operation that can be preempted/interrupted by a foreground command and continued at a later time. A background command can be performed whenever possible when no host foreground commands are currently being executed. Unlike foreground commands which typically have a predetermined completion time, background commands can have an uncertain completion time, depending on how much they are interrupted by foreground commands. Example of background commands are provided at the end of this section, and more information about the use of background commands can be found in U.S. patent application Ser. No. 12/982,833, which is hereby incorporated by reference.

Figure 10:
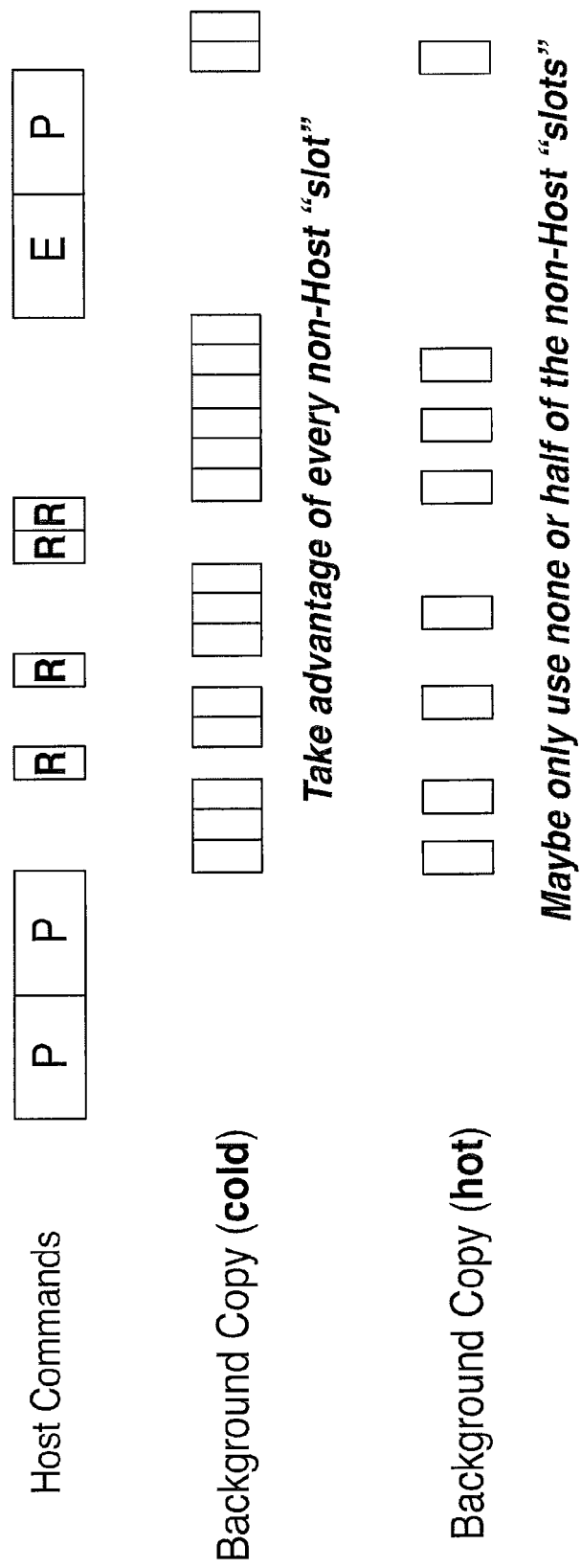
FIG. 10 is an illustration showing modeling performance of background commands according to an embodiment.

As shown in the first two lines in FIG. 10, as the controller 100 performs foreground commands (e.g., program, read, and erase commands) issued by the host 120, there are time slots available between the host commands that can be filled by the controller 100 with background commands. In this way, under low-power operations (or under low temperature conditions, as sensed by the thermal sensor 150), the controller 100 can use spare bus bandwidth to execute a background command, such as a background copy command. However, when there is a period of high activity, such as sustained host transactions, the storage device or possibly specific MCPs (per region of storage access) may become hot. Accordingly, the controller 100 in each MCP can throttle its background activities based on local power or thermal limits, so that the controller 100 ceases or delays background commands based on power or temperature. This is shown illustratively by the third line in FIG. 10, where the controller 100 modulates performance of the background copy commands according to a volume of incoming host commands or according to thermal stress by using only some of the available time slots for background commands.

As noted above, any suitable type of background command can be used, and U.S. patent application Ser. No. 12/982,833, which is hereby incorporated by reference, discusses the use of background commands in more detail. As discussed in that application, a background command can include, but is not limited to, the following operations: data scrambling, column replacement, handling write aborts and/or program failures (via safe zones), read scrubbing, wear leveling, bad block and/or spare block management, error detection code (EDC) functionality, status functionality, encryption functionality, error recovery, and address mapping (e.g., mapping of logical to physical blocks). The following paragraphs describe some of these commands in more detail.

"Data scrambling" or "scrambling" is an invertible transformation of an input bit sequence to an output bit sequence, such that each bit of the output bit sequence is a function of several bits of the input bit sequence and of an auxiliary bit sequence. The data stored in a flash memory device may be scrambled in order to reduce data pattern-dependent sensitivities, disturbance effects, or errors by creating more randomized data patterns. More information about data scrambling can be found in the following patent documents: U.S. patent application Ser. Nos. 11/808,906, 12/209,697, 12/251,820, 12/165,141, and 11/876,789, as well as PCT application no. PCT/US08/88625.

"Column replacement" refers to various implementations of mapping or replacing entirely bad columns, portions of columns, or even individual cells. Suitable types of column replacement techniques can be found in U.S. Pat. Nos. 7,379,330 and 7,447,066.

There are several potential problems in writing to flash memory devices where logically or physically adjacent data may be corrupted outside of the location where the data is attempted to be written. One example is when a write to one area (e.g., a cell, page, or block) of memory fails, and the contents of some surrounding memory may be corrupted. This is referred to as a "program failure" or "program disturb." A similar effect known as "write abort" is when a write (or program) operation is terminated prematurely, for example when power is removed unexpectedly. In both cases, there are algorithms which may be used to pro-actively copy data from a "risk zone" to a "safe zone" to handle write aborts and program failures, as described in U.S. Pat. No. 6,988,175.

"Read scrubbing" or, more generally, "scrubbing" refers to the techniques of refreshing and correcting data stored in a flash memory device to compensate for disturbs. A scrub operation entails reading data in areas that may have received exposure to potentially disturbing signals and performing some corrective action if this data is determined to have been disturbed. Read scrubbing is further described in U.S. Pat. Nos. 7,012,835, 7,224,607, and 7,477,547.

Flash memory devices may be written unevenly, and "wear leveling" refers to techniques that attempt to even out the number of times memory cells are written over their lifetime. Exemplary wear leveling techniques are described in U.S. Pat. Nos. 6,230,233 and 6,594,183.

In general, flash memory devices are manufactured with an excess number of blocks (greater than the defined minimum capacity). Either during factory testing or during use of the device, certain blocks may be discovered as "bad" or "defective," meaning that they are unable to correctly store data and need to be replaced. Similarly, there may be an excess of "good" blocks (greater than the defined minimum capacity) which may be used as "spares" until another block fails or becomes defective. Keeping track of these extra blocks is known as bad block management and spare block management, respectively. More information about bad block and spare block management can be found in U.S. Pat. No. 7,171,536.

Example 5

Dynamically Altering Performance of Commands Based on Temperature

Figure 11:
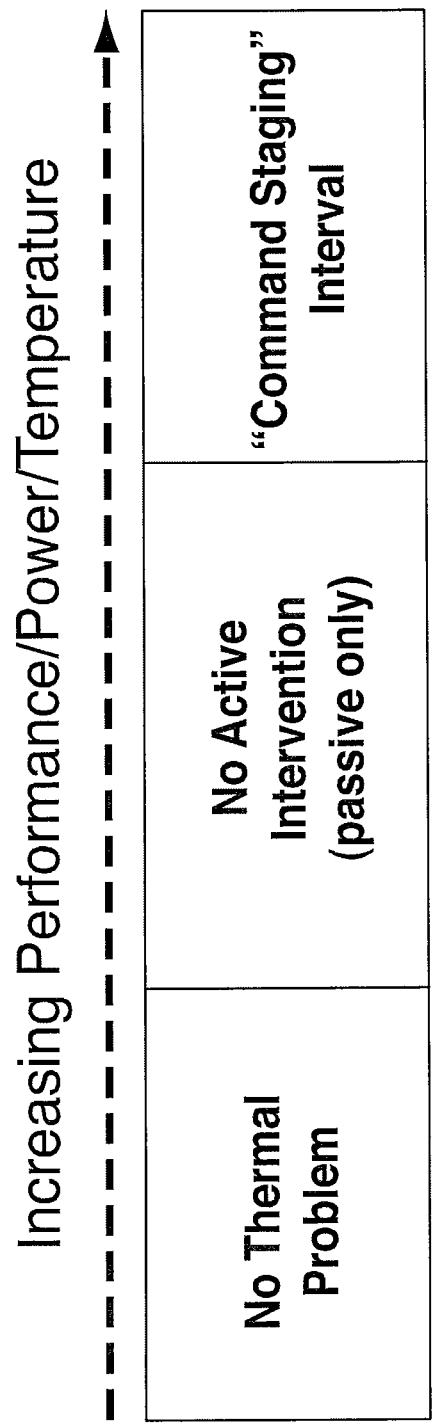
FIG. 11 is an illustration showing how performance of commands can be affected by a reading of a thermal sensor or expected required throttling or intervention due to higher performance activity of an embodiment.

In the above examples, the controller 100 used the power cost associated with each command in order to decide how to dynamically alter when each command is performed in order to meet a power requirement. However, as discussed above, the temperature of the storage device or individual MCPs can be an additional factor to consider in determining how to dynamically alter when the commands are performed. For example, as shown in FIG. 11, "command staging" or other power throttling techniques may be triggered only when the storage device exceeds a predetermined temperature stored in the storage device. If the temperature is below this threshold, there is either no thermal problem or other (passive) techniques can be used. Also, as noted above, the sensed temperature can be used by the controller to move the "baseline" of acceptable power consumption. This recognizes that, for a given a set of commands, the predetermined average power may be exceeded with the storage device is "hot" but not when it is "cold."

Figure 12:
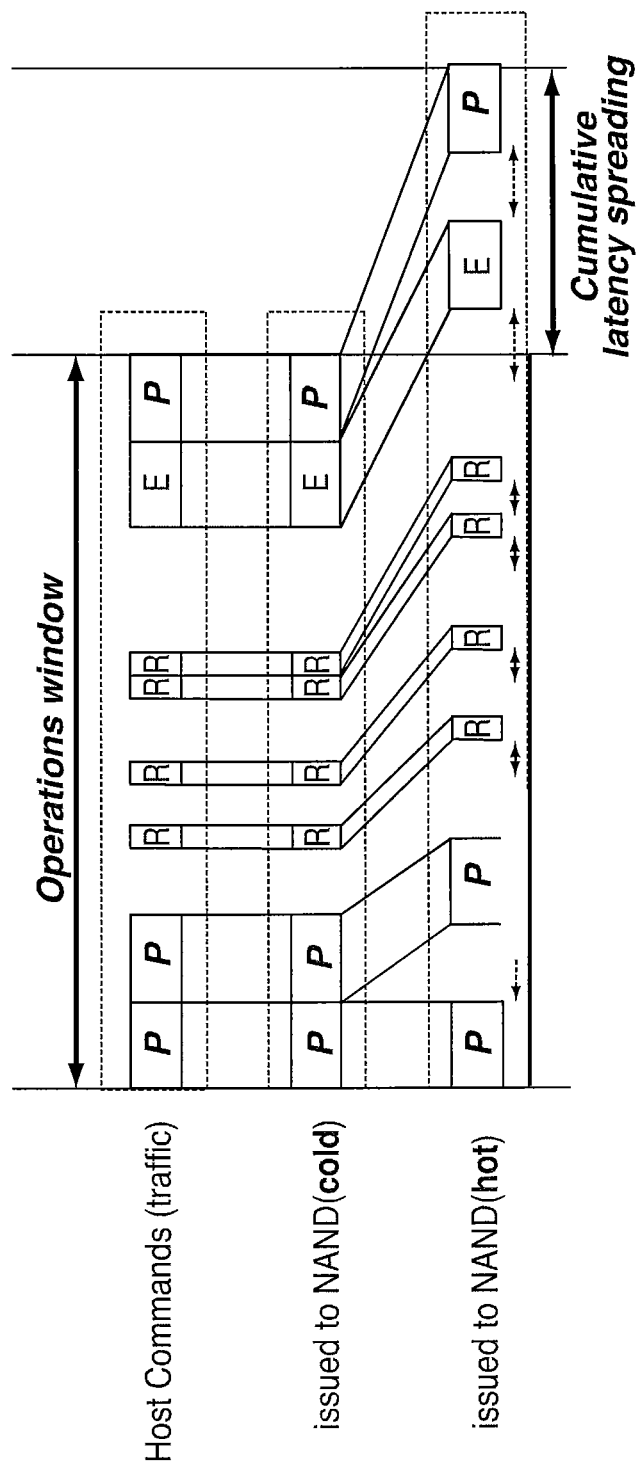
FIG. 12 is an illustration showing how a reading from a thermal sensor can be used in an embodiment to dynamically alter performance of commands.

While temperature can be used in conjunction with the power cost of the commands in determining how to dynamically alter when the commands are performed, it should be noted that temperature can be used by itself For example, based on the reading of a thermal sensor 150 on each target, the controller 100 can modulate the duty cycle of issued commands (thereby introducing gaps between the commands) to stay within a thermal envelope. This is illustrated in FIG. 12. As shown in the first two lines in FIG. 12, when the storage device is "cold," the controller 100 can execute a plurality of commands in a period of time (operations window) as instructed by the host. However, if the temperature exceeds a threshold, the controller 100 considers the storage device to be "hot" and dynamically alters the performance of the commands by spreading them out temporally. As shown by the bottom line in FIG. 12, this can result in some of the commands being performed outside of the operations window. Such commands can be returned to the host as "thermal fail," meaning that the command was not performed because it would be expected to exceed a thermal limit. Upon receiving this notification, the host could reissue the command after a delay.

It should be noted that while only two temperature ranges ("cold" and "hot") are shown in FIG. 12, the controller 100 can be programmed with more than two temperature ranges, where each range is associated with its own technique to dynamically alter the performance of the commands. For example, as the controller 100 senses the storage device getting hotter and hotter (e.g., exceeded one or more predefined thresholds), the controller 100 can add more and more delay between commands.

In yet another embodiment related to temperature, instead of or in addition to the controller 100 storing information on the power cost of each command, the controller 110 can store information on the thermal cost of each command. That is, the controller 100 can store information on how much heat would be generated by each of a plurality of commands (e.g., similar to the table of commands and average power illustrated above) and can dynamically alter when each of those commands is performed so that the performance of the plurality of commands, in the aggregate, does not exceed a predetermined temperature. This embodiment provides advantages, for example, when the performance of a group of commands does not exceed a predetermined average power limit over a period of time but yet is so concentrated in location/address range and/or time to create enough heat in that particular location of extreme activity, or "hotspot", so as to compromise other nearby components (such as memory storage cells), or adversely contribute to a product's thermal interface with other system components or packaging. It should be noted that this embodiment can be used in conjunction with or independently from the power embodiments, as well as with the embodiments using a thermal sensor.

CONCLUSION

It is intended that the foregoing detailed description be understood as an illustration of selected forms that the invention can take and not as a definition of the invention. It is only the following claims, including all equivalents that are intended to define the scope of this invention. Also, some of the following claims may state that a component is operative to perform a certain function or configured for a certain task. It should be noted that these are not restrictive limitations. It should also be noted that the acts recited in the claims can be performed in any order—not necessarily in the order in which they are recited.

What is claimed is:

1. A controller comprising:
   a first interface through which to communicate with a host;
   a second interface through which to communicate with a plurality of flash memory devices;
   a memory; and
   a processor in communication with the first and second interfaces and the memory, wherein the processor is operative to:
   store, in the memory, a plurality of commands to be performed by the plurality of flash memory devices;
   determine how much power will be consumed by each of the plurality of commands; and
   dynamically alter when each of the plurality of commands operating on one or more of the flash memory devices is performed based on the determination of how much power would be consumed so that performance of the plurality of commands does not exceed a predetermined average power limit over a period of time.

2. The controller of claim 1, wherein the processor dynamically alters when each of the plurality of commands is performed by staggering issuance of the plurality of commands.

3. The controller of claim 2, wherein the plurality of commands comprises a plurality of program commands, and wherein the processor staggers issuance of the plurality of program commands to limit a simultaneous peak current consumption.

4. The controller of claim 1, wherein the processor receives the plurality of commands in a certain order and dynamically alters when each of the plurality of commands is performed by re-ordering the plurality of commands.

5. The controller of claim 4, wherein the plurality of commands comprises a plurality of program commands, and wherein the processor re-orders the plurality of program commands to minimize peak power.

6. The controller of claim 1, wherein the processor dynamically alters when each of the plurality of commands is performed by staggering issuance of read commands based on an error correction code (ECC) rate.

7. The controller of claim 1, wherein the plurality of commands comprises a plurality of background commands, and wherein the processor modulates performance of the background commands according to a volume of incoming host commands.

8. The controller of claim 1, wherein the plurality of commands comprises a plurality of background commands, and wherein the processor modulates performance of the background commands according to thermal stress.

9. The controller of claim 7 or 8, wherein at least one background command comprises a copy command, a move command, a data scrambling command, a column replacement command, a command to handle write aborts and/or program failures (via safe zones), a read scrubbing command, a wear leveling command, a bad block and/or spare block management command, an error detection code (EDC) command, a status command, an encryption command, an error recovery command, and an address mapping command.

10. The controller of claim 1, wherein the processor is further operative to receive a temperature reading from a thermal sensor, and wherein the processor uses both the temperature reading and the determination of how much power will be consumed in deciding how to dynamically alter when each of the plurality of commands is performed.

11. The controller of claim 1, wherein at least one of the plurality of flash memory devices comprises a three-dimensional memory array.

12. The controller of claim 11, wherein the three-dimensional memory array is a passive element array.

13. The controller of claim 11, wherein word lines and/or bit lines in the three-dimensional memory array are shared between levels.

14. A storage device comprising:
   a plurality of flash memory devices;
   a thermal sensor; and
   a controller in communication with the plurality of flash memory devices and the thermal sensor, wherein the controller comprises a memory and a processor operative to:
      store, in the memory, a plurality of commands to be performed by the plurality of flash memory devices;
      receive a temperature reading from the thermal sensor; and
      dynamically alter when each of the plurality of commands operating on one or more of the flash memory devices is performed based on the temperature reading from the thermal sensor so that performance of the plurality of commands does not exceed at least one of a predetermined average power limit over a period of time and a predetermined temperature.

15. The storage device of claim 14, wherein the processor dynamically alters when each of the plurality of commands is performed by staggering issuance of the plurality of commands.

16. The storage device of claim 15, wherein the plurality of commands comprises a plurality of program commands, and wherein the processor staggers issuance of the plurality of program commands to limit a simultaneous peak current consumption.

17. The storage device of claim 14, wherein the processor receives the plurality of commands in a certain order and dynamically alters when each of the plurality of commands is performed by re-ordering the plurality of commands.

18. The storage device of claim 17, wherein the plurality of commands comprises a plurality of program commands, and wherein the processor re-orders the plurality of program commands to minimize peak power.

19. The storage device of claim 14, wherein the processor dynamically alters when each of the plurality of commands is performed by staggering issuance of read commands based on an error correction code (ECC) rate.

20. The storage device of claim 14, wherein the plurality of commands comprises a plurality of background commands, and wherein the processor modulates performance of the background commands according to a volume of incoming host commands.

21. The storage device of claim 14, wherein the plurality of commands comprises a plurality of background commands, and wherein the processor modulates performance of the background commands according to thermal stress.

22. The storage device of claim 20 or 21, wherein at least one background command comprises a copy command, a move command, a data scrambling command, a column replacement command, a command to handle write aborts and/or program failures (via safe zones), a read scrubbing command, a wear leveling command, a bad block and/or spare block management command, an error detection code (EDC) command, a status command, an encryption command, an error recovery command, and an address mapping command.

23. The storage device of claim 14, wherein the processor is further operative to determine how much power will be consumed by each of the plurality of commands and wherein the processor uses both the temperature reading and the determination of how much power would be consumed in deciding how to dynamically alter when each of the plurality of commands is performed.

24. The storage device of claim 14, wherein the thermal sensor is in the controller.

25. The storage device of claim 14, wherein the thermal sensor is in one of the flash memory devices.

26. The storage device of claim 14, wherein at least one of the plurality of flash memory devices comprises a three-dimensional memory array.

27. The storage device of claim 26, wherein the three-dimensional memory array is a passive element array.

28. The storage device of claim 26, wherein word lines and/or bit lines in the three-dimensional memory array are shared between levels.

29. A controller comprising:
   a first interface through which to communicate with a host;
   a second interface through which to communicate with a plurality of flash memory devices;
   a memory; and
   a processor in communication with the first and second interfaces and the memory, wherein the processor is operative to:
      store, in the memory, a plurality of commands to be performed by the plurality of flash memory devices;
      determine how much heat would be generated by each of the plurality of commands; and
      dynamically alter when each of the plurality of commands operating on one or more of the flash memory devices is performed based on the determination of how much heat would be generated so that performance of the plurality of commands does not exceed a predetermined temperature.

30. The controller of claim 29, wherein the processor dynamically alters when each of the plurality of commands is performed by staggering issuance of the plurality of commands.

31. The controller of claim 29, wherein the processor receives the plurality of commands in a certain order and dynamically alters when each of the plurality of commands is performed by re-ordering the plurality of commands.

32. The controller of claim 29, wherein the processor dynamically alters when each of the plurality of commands is performed by staggering issuance of read commands based on an error correction code (ECC) rate.

33. The controller of claim 29, wherein the plurality of commands comprises a plurality of background commands, and wherein the processor modulates performance of the background commands according to a volume of incoming host commands.

34. The controller of claim 33, wherein at least one background command comprises a copy command, a move command, a data scrambling command, a column replacement command, a command to handle write aborts and/or program failures (via safe zones), a read scrubbing command, a wear leveling command, a bad block and/or spare block management command, an error detection code (EDC) command, a status command, an encryption command, an error recovery command, and an address mapping command.

35. The controller of claim 29, wherein at least one of the plurality of flash memory devices comprises a three-dimensional memory array.

36. The controller of claim 35, wherein the three-dimensional memory array is a passive element array.

37. The controller of claim 35, wherein word lines and/or bit lines in the three-dimensional memory array are shared between levels.

* * * * *